United States Patent
Greene et al.

(10) Patent No.: US 9,858,616 B2
(45) Date of Patent: Jan. 2, 2018

(54) ADVERTISING PAYMENT BASED ON CONFIRMED ACTIVITY PREDICTION

(75) Inventors: Daniel H. Greene, Sunnyvale, CA (US); Kurt E. Partridge, Palo Alto, CA (US); James M. A. Begole, San Jose, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 1399 days.

(21) Appl. No.: 12/062,837

(22) Filed: Apr. 4, 2008

(65) Prior Publication Data

US 2009/0222346 A1 Sep. 3, 2009

Related U.S. Application Data

(60) Provisional application No. 61/032,421, filed on Feb. 28, 2008.

(51) Int. Cl.
*G06Q 30/02* (2012.01)
*G06Q 30/08* (2012.01)
*G06Q 10/04* (2012.01)

(52) U.S. Cl.
CPC ............. *G06Q 30/08* (2013.01); *G06Q 10/04* (2013.01); *G06Q 30/02* (2013.01);
(Continued)

(58) Field of Classification Search
CPC ............... G06Q 30/02; G06Q 30/0273; G06Q 30/0267; G06Q 30/0269; G06Q 30/0275;
(Continued)

(56) References Cited

U.S. PATENT DOCUMENTS

| 7,027,801 | B1 | 4/2006 | Hall | |
| 7,139,252 | B2 * | 11/2006 | Babu | H04L 29/06 340/539.13 |

(Continued)

FOREIGN PATENT DOCUMENTS

| WO | 0213552 A2 | 2/2002 |
| WO | 02013552 A3 | 2/2002 |

(Continued)

OTHER PUBLICATIONS

J. Ghosh, M. Beal, H. Ngo, and C. Qiao, "On profiling mobility and predicting locations for wireless users", In Second International workshop on Multi-hop ad hoc networks: from theory to reality, pp. 55-62. ACM Press, 2006.*

*Primary Examiner* — Eric T Wong
*Assistant Examiner* — Joshua D. Bradley
(74) *Attorney, Agent, or Firm* — Shun Yao; Park, Vaughan, Fleming & Dowler LLP (57) ABSTRACT

One embodiment of the present invention provides a system for facilitating presentation of activity-based advertising. During operation, the system receives a set of contextual data of a customer and makes a prediction of the customer's future activity. The system then receives a number of advertisements from the advertisers. Based on the prediction, the system chooses a received advertisement to present to the customer. The system further determines the customer's subsequent activity and confirms the prediction of the customer's activity. The system then receives payments from the advertisers whose advertisement is presented based on whether the prediction is confirmed.

17 Claims, 4 Drawing Sheets

(52) U.S. Cl.
CPC ..... *G06Q 30/0242* (2013.01); *G06Q 30/0251* (2013.01); *G06Q 30/0255* (2013.01); *G06Q 30/0261* (2013.01); *G06Q 30/0264* (2013.01); *G06Q 30/0273* (2013.01); *G06Q 30/0275* (2013.01)

(58) Field of Classification Search
CPC ........... G06Q 30/0242; G06Q 30/0261; H04H 60/33; H04H 60/46; H04H 60/63
USPC .................................................. 705/14.49, 14
See application file for complete search history.

(56) References Cited

U.S. PATENT DOCUMENTS

| | | | | |
|---|---|---|---|---|
| 7,835,939 | B1* | 11/2010 | Karlsson | G06Q 30/02 705/7.31 |
| 8,027,879 | B2* | 9/2011 | Ramer | G06F 17/30867 705/14.4 |
| 8,073,460 | B1* | 12/2011 | Scofield | G06Q 30/02 455/414.1 |
| 8,099,325 | B2* | 1/2012 | Gangadharpalli | G06Q 30/02 705/14.49 |
| 8,799,814 | B1* | 8/2014 | Bryc | G06Q 30/0242 705/14.1 |
| 9,516,470 | B1* | 12/2016 | Scofield | H04W 4/206 |
| 2002/0077897 | A1* | 6/2002 | Zellner et al. | 705/14 |
| 2002/0095333 | A1 | 7/2002 | Jokinen | |
| 2002/0099600 | A1* | 7/2002 | Merriman | G06Q 30/02 705/14.52 |
| 2003/0115098 | A1 | 6/2003 | Kang | |
| 2003/0220835 | A1 | 11/2003 | Barnes, Jr. | |
| 2004/0038665 | A1 | 2/2004 | Hosono | |
| 2005/0049765 | A1* | 3/2005 | Chetia | G06Q 30/02 701/31.4 |
| 2005/0144067 | A1* | 6/2005 | Farahat | G06Q 30/02 705/14.52 |
| 2005/0187818 | A1* | 8/2005 | Zito et al. | 705/14 |
| 2005/0239495 | A1 | 10/2005 | Beyne | |
| 2006/0064346 | A1* | 3/2006 | Steenstra | G06Q 30/0261 705/14.64 |
| 2006/0212350 | A1* | 9/2006 | Ellis | G06Q 30/0242 705/14.41 |
| 2006/0240808 | A1 | 10/2006 | Crolley | |
| 2006/0248035 | A1* | 11/2006 | Gendler | G06F 17/30864 |
| 2007/0094042 | A1* | 4/2007 | Ramer | G06F 17/30867 705/1.1 |
| 2007/0162329 | A1* | 7/2007 | Lee | G06Q 30/00 705/14.47 |
| 2007/0179792 | A1* | 8/2007 | Kramer | G06Q 30/02 705/1.1 |
| 2007/0179846 | A1* | 8/2007 | Jain et al. | 705/14 |
| 2008/0004948 | A1* | 1/2008 | Flake | G06Q 30/02 705/14.71 |
| 2008/0004954 | A1* | 1/2008 | Horvitz | G06Q 30/02 705/14.49 |
| 2008/0103850 | A1 | 5/2008 | Shen | |
| 2008/0153512 | A1* | 6/2008 | Kale | H04W 4/02 455/456.3 |
| 2008/0189179 | A1* | 8/2008 | Marouani | G06Q 30/02 705/14.54 |
| 2008/0201283 | A1* | 8/2008 | Fitzpatrick | G06F 17/30867 706/21 |
| 2008/0214166 | A1* | 9/2008 | Ramer | G06Q 30/0257 455/414.3 |
| 2008/0281687 | A1* | 11/2008 | Hurwitz | G06Q 30/02 705/14.1 |
| 2008/0300983 | A1* | 12/2008 | Chen et al. | 705/14 |
| 2008/0306826 | A1* | 12/2008 | Kramer | G06Q 30/02 705/14.14 |
| 2009/0006194 | A1* | 1/2009 | Sridharan | G06Q 30/02 705/14.62 |
| 2009/0019061 | A1* | 1/2009 | Scannell, Jr. | 707/10 |
| 2009/0024476 | A1* | 1/2009 | Baar et al. | 705/14 |
| 2009/0068992 | A1* | 3/2009 | Takehara et al. | 455/412.1 |
| 2009/0106085 | A1* | 4/2009 | Raimbeault | G06Q 20/208 705/14.44 |
| 2009/0144207 | A1* | 6/2009 | Dominowska et al. | 705/400 |
| 2009/0171749 | A1* | 7/2009 | Laruelle et al. | 705/10 |
| 2009/0171763 | A1* | 7/2009 | Dong | G06Q 10/04 705/35 |
| 2009/0222346 | A1* | 9/2009 | Greene et al. | 705/14 |
| 2010/0312646 | A1* | 12/2010 | Gupta et al. | 705/14.58 |
| 2013/0311279 | A1* | 11/2013 | Bui | G06Q 30/00 705/14.51 |

FOREIGN PATENT DOCUMENTS

| | | |
|---|---|---|
| WO | 2005025252 A2 | 3/2005 |
| WO | 2005101863 A2 | 10/2005 |
| WO | 2007109541 A2 | 9/2007 |
| WO | 2007109541 A3 | 9/2007 |
| WO | 2007120571 A1 | 10/2007 |
| WO | 2008003089 A2 | 1/2008 |
| WO | 2008003089 A3 | 1/2008 |

\* cited by examiner

ADVERTISING PAYMENT BASED ON CONFIRMED ACTIVITY PREDICTION

RELATED APPLICATIONS

This application claims priority under 35 U.S.C. section 119(e) to U.S. Provisional Application No. 61/032,421, filed on Feb. 28, 2008, the contents of which are herein incorporated by reference.

This application is related to pending U.S. Patent Application "Receptive Opportunity Presentation of Activity-Based Advertising," application Ser. No. 12/062,812, filed 4 Apr. 2008; U.S. Patent Application "Managing Auction Size for Activity-Based Advertising," application Ser. No. 12/062,823, filed 4 Apr. 2008; U.S. Patent Application "Incentive Mechanism for Developing Activity-Based Triggers of Advertisement Presentation," application Ser. No. 12/062,785, filed 4 Apr. 2008; and U.S. Patent Application "Identifying Indeterminacy for Activity-Based Advertising," application Ser. No. 12/062,698, filed 4 Apr. 2008.

BACKGROUND

This disclosure generally relates to advertising systems. In particular, this disclosure relates to presenting advertisements based on receptive opportunities and a customer's activities.

The ubiquitous Internet connectivity coupled with wide deployment of wireless devices is drastically changing the advertising industry. Of the $385 billion spent globally on advertising in 2005, online and wireless spending accounted for $19 billion. Internet advertising was the fastest-growing form of advertisement, with a cumulative annual growth rate of 18.1 percent. However, Internet advertising has its limitations, and new opportunities remain to be discovered to sustain the dramatic rate of growth in new media advertising.

Existing Internet advertisements only work when a user is online and watching a computer screen. Traditional advertising, in contrast, comes in many forms. For example, signs can advertise products inside retail stores. Radio programs can advertise products when the listener engages in a wide variety of activities. Printed advertisements can appear anywhere paper is used, from newspapers, to flyers, receipts, and ticket stubs. Although Internet advertising surpasses traditional advertising in its ability to better target consumer interest, it still cannot be closely tailored to human activities.

Delivering activity-based advertisements to a customer's mobile device is a new technique that compliments the conventional advertising methods. Activity-based advertising can better target a customer's needs and dynamically adjust to a customer's activity. However, in mobile, activity-based advertising systems, it can be challenging to predict a customer's future activity correctly, and yet it is valuable to present advertising based on accurately predicted future activities. Hence, it is important to have a viable payment mechanism that is tailored to the dynamic nature of activity-based advertising and that can sufficiently incentivize the advertisers to pay for such activity-based advertising.

BRIEF DESCRIPTION OF THE FIGURES

In the drawings, the same reference numbers identify identical or substantially similar elements or acts. The most significant digit or digits in a reference number refer to the figure number in which that element is first introduced. For example, element 102 is first introduced in and discussed in conjunction with FIG. 1.

SUMMARY

One embodiment of the present invention provides a system for facilitating presentation of activity-based advertising. During operation, the system receives a set of contextual data of a customer and makes a prediction of the customer's future activity. The system then receives a number of advertisements from the advertisers. Based on the prediction, the system chooses a received advertisement to present to the customer. The system further determines the customer's subsequent activity and confirms the prediction of the customer's activity. The system then receives payments from the advertisers whose advertisement is presented based on whether the prediction is confirmed.

In a variation of this embodiment, the system auctions advertising opportunities to the advertisers based on the prediction, and receives one or more bids from the advertisers.

In a further variation, the system computes an estimated accuracy of the prediction.

In a further variation, the system determines the winning bids based on the estimated accuracy.

In a further variation, the system communicates the estimated accuracy of the prediction to the advertisers, thereby allowing the advertisers to set their bids accordingly.

In a variation of this embodiment, payment is only received when the prediction is confirmed.

In a variation of this embodiment, the system allows an advertiser to set a portion of the payment that is contingent upon whether the prediction is confirmed.

In a variation of this embodiment, the system allows an advertiser to purchase an insurance under which the advertiser can receive a refund when the prediction is not confirmed by the customer's subsequent behavior.

In a variation of this embodiment, the system receives payments from the advertisers whose advertisement is presented based on the customer's subsequent purchase behavior as a result of the advertisement.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

In activity-based advertising, it is useful to predict future activities of customers. Such predictions, if accurate, will be valuable for advertisers. For example, the knowledge that a customer is driving to a vacation resort can help a system identify opportunities for advertising services in the resort area. Unfortunately, predicting the future is not always easy, and the predictions are not always accurate. Hence, advertisers may not always wish to rely on such predictions. This disclosure describes a method where advertisers are charged based on confirmed predictions. As a result, advertisers can have less financial risk when the predictions are inaccurate.

Embodiments of the present invention provide an advertising system that presents advertisements based predictions of a customer's activities and allows advertisers to pay for these advertisements based on confirmed predictions. This system can dynamically adjust the payment for advertisements based on the accuracy of its prediction of customer activities.

In some embodiments, the system targets advertising to mobile customers (e.g., via cell phones, personal digital assistants (PDAs), and in some cases nearby electronic billboards), and delivers activity-targeted advertising that can influence the customer's future purchase behavior. The system can receive a customer's contextual information, such as his location, current time, weather, etc., to predict what activity the customer is likely to perform next. Based on this prediction, the system can identify a good opportunity for presenting advertisements.

The present novel advertising system includes a charging mechanism that charges an advertiser based on correct predictions. In one embodiment, the advertiser pays only when the customer's subsequent activity confirms the prediction. For example, if the customer is predicted to visit a shopping center, an advertisement is presented, and the customer does in fact visit the shopping center, then the advertiser will pay a corresponding charge according to the confirmed prediction.

This disclosure uses the following terminologies:

Advertiser. This term typically refers to a company wishing to advertise its service or products. This disclosure uses the terms "advertiser" and "advertisement broadly to refer to content provider and content, where, for example, the content provider is willing to pay to have targeted content delivered to customers, even if that content does not advertise a specific service or product. The typical advertiser would like to maximize profit, where advertising is one of the costs. For this reason, well targeted advertising is more effective for advertisers.

Customer. This term refers to a recipient of the advertising—a potential customer of the advertisers. Customers typically welcome some advertisements but prefer not to receive other kinds of advertisements. For this reason, well targeted advertising is more acceptable for customers. This disclosure uses the term "customer" broadly to include people who receive content, even if that content is not meant to include to the person as a customer of the advertiser.

Provider. This term refers to the provider of the service that delivers advertisements to customers. The provider is responsible for delivering well targeted advertising. Embodiments of the present invention provide the technology that a provider can use to deliver advertisements based on a customer's activity and context. In some embodiments, there can be a separate publisher who provides the channels for presentation to the customer. The provider can choose the advertisements and the publisher's channel, and, depending on the payment mechanism, charges the advertiser and rewards the publisher.

Presentation. This term refers to the showing of an advertisement to a customer. Note that embodiments of the present invention are independent from the form of the presentation. Presentation might include adding a banner or pop-up to a PDA or cell phone, playing an audio message by phone, music player, or car stereo, modifying a map on a GPS navigation device, or changing a billboard near the customer.

Payment. This term refers to the amount an advertiser pays the provider after a "successful" presentation. Successful presentations can be defined in many different ways. Correspondingly, the payment can also be structured differently. It could be pay-per-presentation, pay-per-click, or pay-per-action (a form of commission defined by the advertiser). In one embodiment, a new pay-per-confirmed-prediction payment structure is used for activity-based advertising.

Activity. This term refers to the activity of the customer. For example, a customer's activity might be "walking towards a train station." The activity can be described at different semantic levels. For example, "walking towards a train station" might also be described as "commuting home after work." In the advertising system in accordance with some embodiments, the activity may be partially described with objectives, such as "to obtain exercise," tools, such as "with a bicycle," skill levels, such as "expert," and other modifiers/qualifiers of the activity. Activity-targeting or activity-based advertising may rely on complete or partial descriptions on different semantic levels to facilitate reaching large numbers of relevant activities.

Context. This term refers to additional information surrounding the customer's activity. For example, the activity might be occurring on a rainy day. In some embodiments, both the activity description and the context description are used for activity-based presentation of advertisements. Note that the term "context" if often used in conjunction with terms related to activities. The terms "activity," "activity targeting," and "activity-based advertising" are typically used in a way that involves features of the activity as well as possible additional context for targeting the advertising.

Opportunity. Also referred to as "advertising opportunity," "presentation opportunity," or "receptive opportunity," this term refers to a time window identified by the advertising system during which selected advertisements can be presented to a customer.

In some embodiments of the present invention, the provider makes predictions, and the advertisers bid on opportunities that contain predictions. For example, based on a customer's location trace (which can be provided by the customer's GPS-equipped mobile device), the provider predicts that a customer will visit a shopping center. Subsequently, the provider identifies a good advertising opportunity corresponding to the time the customer spends waiting at a bus station. An advertiser can bid on that opportunity which is based on the prediction. The bid amount may include a component that will be paid only if the prediction is confirmed. In this example, the advertiser will pay only when the customer actually visits the shopping center. If the customer does not go to the shopping center, the component in the bid amount that is contingent upon the confirmed prediction will be foregone.

In one embodiment, the provider can estimate the accuracy of its predictions based on historic data and the current context. With this estimate, the provider can compute the expected financial return from each advertiser's bid, since a respective bid may contain a portion that is only paid when the prediction is confirmed. The provider can then rank the bids based on each bid's expected return and select the bids that generate the highest expected returns.

Figure 1:
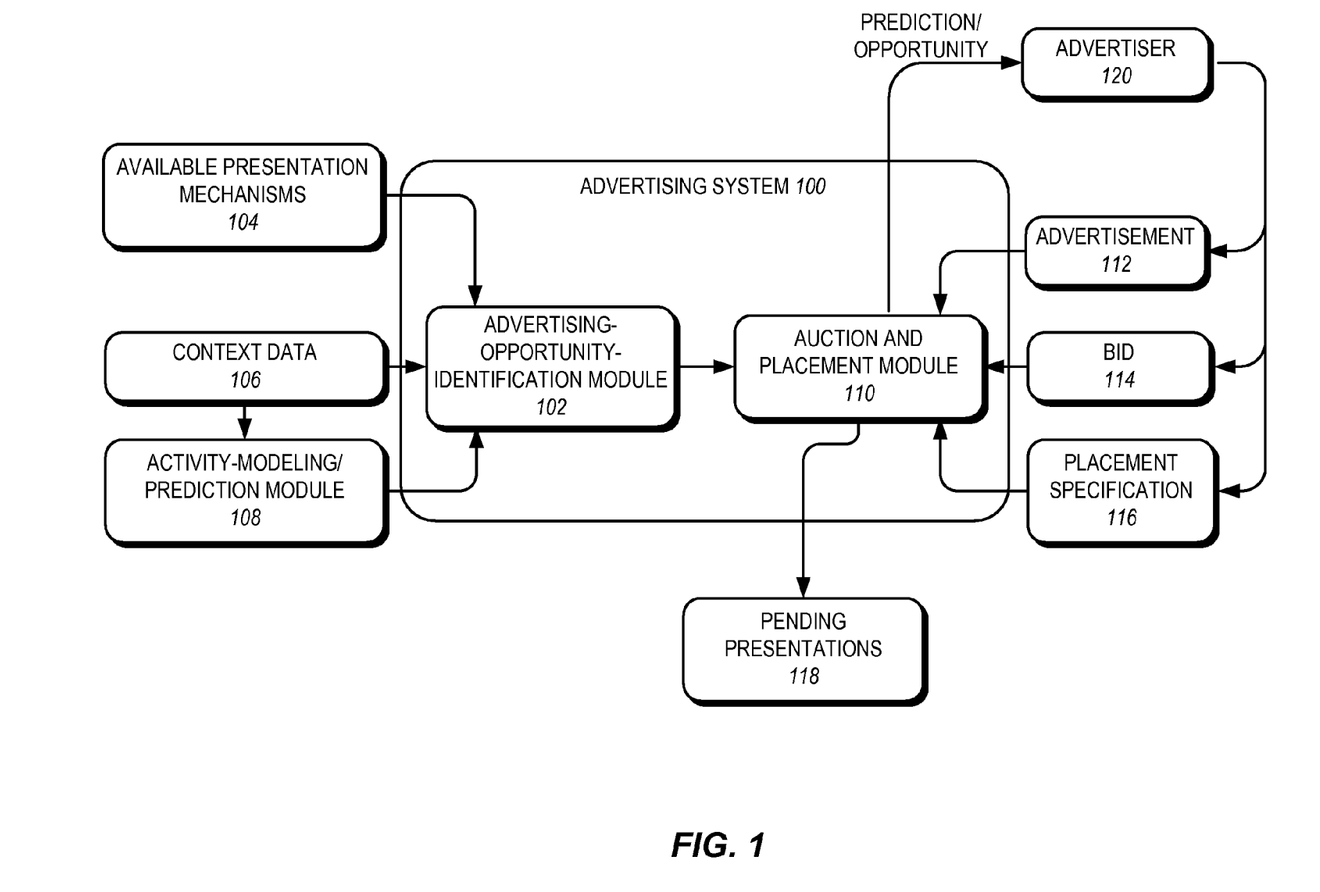
FIG. 1 illustrates an exemplary architecture for a receptive-opportunity-based advertising system that allows advertiser payment based on confirmed activity prediction, in accordance with an embodiment of the present invention.

FIG. 1 illustrates an exemplary architecture for a receptive-opportunity-based advertising system that allows advertiser payment based on confirmed activity prediction, in accordance with an embodiment of the present invention. In one embodiment, an advertising system 100 includes two modules, an advertising-opportunity-identification module 102 and an auction and placement module 110. Advertising-opportunity-identification module 102 is in communication with available presentation mechanisms 104 and receives context data 106, which indicates the current context of the customer. In addition, advertising-opportunity-identification module 102 is also in communication with an activity-modeling/prediction module 108, which predicts or derives the customer's activities.

Activity-modeling/prediction module 108 can reside on a customer's mobile device or within advertising system 100. During operation, activity modeling/prediction module 108 makes predictions of the future activities of a customer. In one embodiment, activity-modeling/prediction module 108 uses context data 106 to derive past and current activities, and make predictions of future activities associated with a customer. For example, the customer's cell phone can be equipped with a GPS. Based on pre-stored venue information and the traces of the customer's locations at different times, activity-modeling/prediction module 108 can determine that at a certain time of day the customer typically engages in a particular activity.

Context data 106 can include different types of information that can be used to determine the customer's past, current, or future activities. Such information can include physical information such as time of day, day of week, weather condition, the customer's location, speed of motion, etc. Context data 106 can also include logical contents pertaining to the customer, such as the content of the customer's calendar, instant messages, and emails, history of the customer's past activities, and the customer's previous response to advertisements. In one embodiment, context data 106 can be collected by a mobile device, such as a cell phone, carried by the customer.

In one embodiment, presentation mechanisms 104 can include a variety of devices that can present an advertisement. Such devices can include a mobile phone, PDA, computer, public display, radio, TV, in-vehicle navigation system, etc.

Based on the activity prediction, context data 106, and information about available presentation mechanisms 104 which are in the vicinity of the customer (e.g., the customer's cell phone or a dynamic billboard close to the customer), advertising-opportunity-identification module 102 identifies suitable receptive opportunities for advertising. For example, the system might identify an activity of "eat" when a customer is waiting on a platform for a commuter train, and has not yet had dinner. Correspondingly, advertising-opportunity-identification module 102 produces an opportunity description, which can include the time, presentation mechanism, and topic (which corresponds to the identified activity) for advertisements.

Note that advertising-opportunity-identification module 102 can reside on a customer's mobile device or on a server at the provider's premise.

Once good advertising opportunities are identified, the system then auctions the prediction-based opportunities to the advertisers. In one embodiment, auction and placement module 110 can optionally communicate activity prediction and advertising opportunity to an advertiser 120, which is a bidder in this auction. This communication is optional because in some embodiments the advertiser may already know what predicted activity might be a valuable target and submit, in advance, a bid 114, a corresponding advertisement 112, and a set of placement specification 116 which includes the predicted activity or activities as a target for placing advertisement. Note that, as described above, bid 114 may include a portion that is contingent upon the success of the activity prediction.

Although the example in FIG. 1 only shows one bidding advertiser, advertising system 100 can accommodate multiple bidders. After the bids are received, auction and placement module 110 then selects the bids with the highest expected returns. The advertisements submitted with these winning bids are then identified as pending presentations 118 which will be presented during the receptive opportunity.

In some embodiments, advertising system 100 can use a pay-per-confirmed-prediction method to charge the bidders. That is, a winning bidder does not have to pay for the advertisement unless the activity predication is confirmed by a customer's subsequent behavior.

Note that the payment does not need to be exclusively based on the pay-per-confirmed-prediction method. The pay-per-confirmed-prediction component can be a part of a larger formula that also includes other methods of charging and advertiser.

There can be other variations to the above scheme. In one embodiment, the advertiser can choose the magnitude of the pay-per-confirmed-prediction component in the charge, and the provider can evaluate the bid as described above. In another embodiment, the advertiser can develop payment formulas that include a component based on a confirmed prediction, a component that depends on presentation, and a component that depends on subsequent actions taken by the customer. The bidders can use these formulas to determine their bids.

Note that it can be option for the provider to release estimates of the accuracy of its predictions. If the estimates are released, then advertisers can better strategize their bidding. However, not releasing estimates simplifies the system. One of the benefits of pay-per-confirmed-prediction payment is that it can allocate the risks associated with prediction to the provider.

Note that an interesting scenario might arise when an advertiser bids on a prediction, presents an advertisement, and then the customer responds to the advertisement and invalidates the prediction. For example, an advertiser, which is a shop located outside a shopping center, bids in an auction based on the prediction that a customer is about to visit the shopping center. (Indeed, this will likely be a valuable pattern in activity-based advertising, where businesses with poor locations bid to co-opt the flow of customers to nearby popular locations.) In one embodiment, when the advertising succeeds but invalidates the prediction (e.g., when the customer actually decided not to visit the shopping center, but instead visits the shop located outside), the provider can use a payment formula that charges the advertiser when the customer's subsequent behavior is positively influenced by the advertising.

In a further embodiment, the provider can offer insurance to the advertisers against undesirable prediction outcome. In this case, the advertisers would bid for advertisement placement and pay for placement of the advertisement. They could also pay extra for insurance so that if the user's future behavior does not match the provider's prediction, the advertisers would be refunded a portion of their payment. In some embodiments, the advertiser can also bid for this insurance. If the provider has an accurate predictor of user behavior, then the provider would be in a good position to estimate the odds and how much to charge for insurance.

Figure 2:
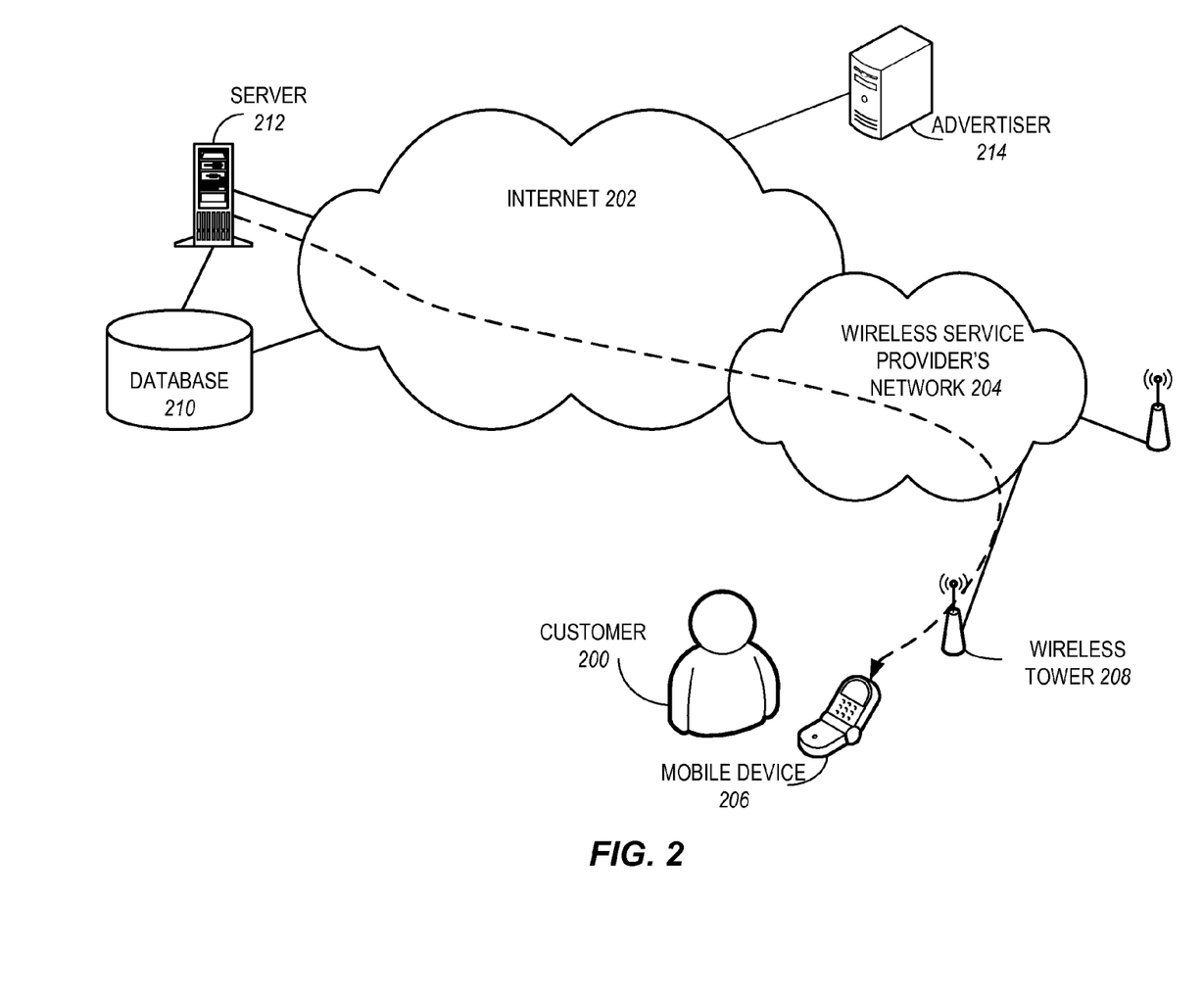
FIG. 2 presents a block diagram illustrating an exemplary mode of operation of a receptive-opportunity-based advertising system, in accordance with an embodiment of the present invention.

FIG. 2 presents a block diagram illustrating an exemplary mode of operation of a receptive-opportunity-based advertising system, in accordance with an embodiment of the present invention. In this example, a customer 200 uses a mobile device 206, which can be a smart phone. Mobile device 206 is in communication with server 212 via a wireless tower 208, a wireless service provider's network 204 and the Internet 202. During operation, mobile device 206 collects a set of context data, such as customer 200's calendar content, the GPS trace of the places he has been to, the current time, etc., and communicates such information to server 212. For example, based on the context data, server 212 can learn that it is now 6 pm, customer 200 has just left the office, and that he is currently at a train station. From previously collected data, server 212 also learns that customer 200 typically visits a restaurant after the train ride. Based on this information, predicts that customer 200 is likely going to a restaurant after the train ride, and determines that the next 15 minutes would be a good receptive opportunity to present advertisements for restaurants and bars. Optionally, server 212 can communicate this opportunity description, which in one embodiment includes at least the topics and a time window, to an advertiser 214. In response to the opportunity description, or in advance of this communication, advertiser 214 submits one or more bids with advertisements to be presented during the opportunities. The winning bids are then stored in database 210 as pending presentations.

Subsequently, server 212 retrieves the advertisements stored in database 210, and selects the pending presentations that match the opportunity description. Server 212 then communicates the advertisements and instructions on how to present these advertisements to mobile device 206. In one embodiment, the advertisements can be streamed video, audio, graphics, text, or a combination of above. After receiving the advertisements, mobile device 206 presents these advertisements based on the instructions. Mobile device 206 then continues to monitor customer 200's locations and sends this data back to server 212. Server 212 can then confirm whether customer 200 actually visits a restaurant after getting off the train. If so, the earlier prediction is confirmed, and advertiser 214 is charged a predetermined amount.

Note that other presentation mechanism can also be used. For example, the presentation mechanism can be a nearby LCD display installed in the train. The LCD display can be equipped with some communication mechanism, such as Bluetooth, to communicate with mobile device 206. During the presentation, mobile device 206 can stream the advertisements to the LCD display, so that customer 200 can view the advertisements more easily on a bigger screen.

Figure 3:
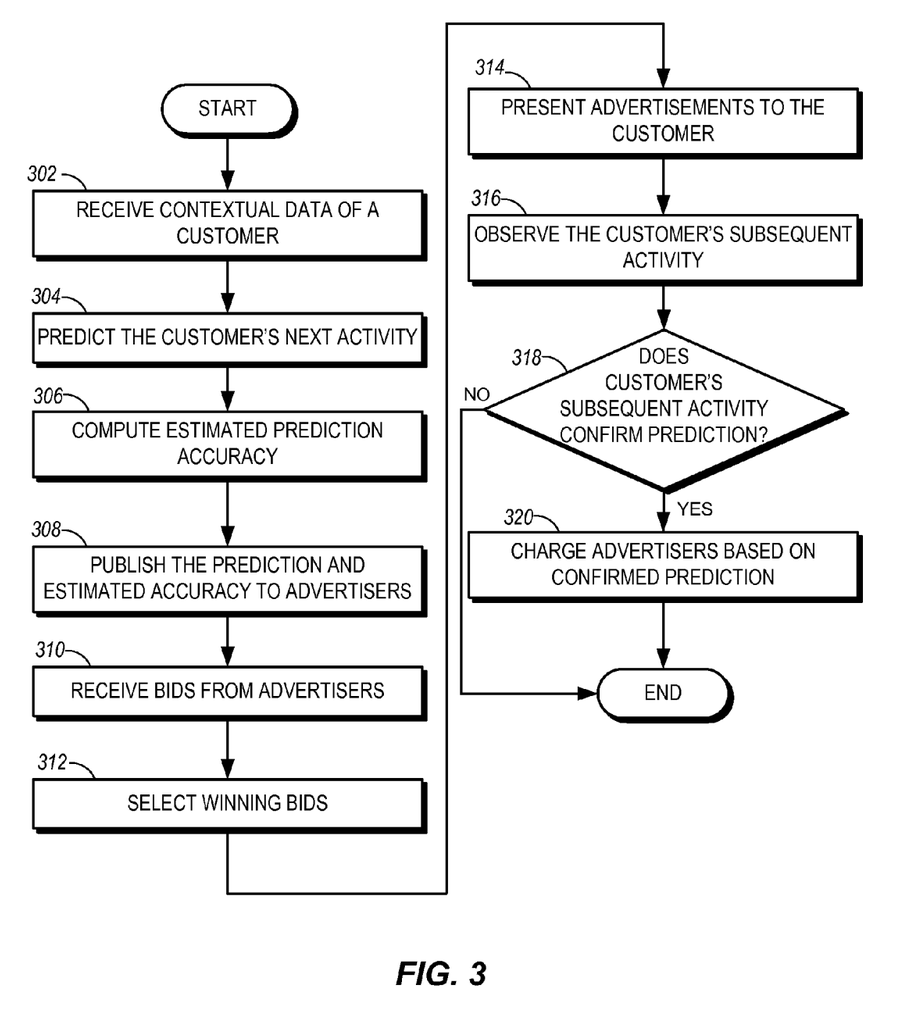
FIG. 3 presents a flowchart illustrating an exemplary process of auctioning activity-based advertising opportunities and collecting advertiser payments based on confirmed prediction, in accordance with an embodiment of the present invention.

FIG. 3 presents a flowchart illustrating an exemplary process of auctioning activity-based advertising opportunities and collecting advertiser payments based on confirmed prediction, in accordance with an embodiment of the present invention. During operation, the system receives contextual data of a customer (operation 302). The system then predicts the customer's next activity and identifies a corresponding advertising opportunity (operation 304). Optionally, the system can compute the estimated prediction accuracy (operation 306). Further, the system can optionally publish the prediction and estimated accuracy to advertisers (operation 308).

Prior to any earlier operations, or optionally subsequent to operation 308, the system receives a number of bids from the advertisers (operation 310). The system then selects the winning bids (operation 312). Next, the system presents the advertisements to the customer during the opportunity (operation 314). The system further observes the customer's subsequent activity (operation 316), and determines whether the earlier prediction is confirmed (operation 318). If the prediction is confirmed, the system charges the advertiser based on the confirmed prediction (operation 320). Otherwise, the advertiser is not charged.

Figure 4:
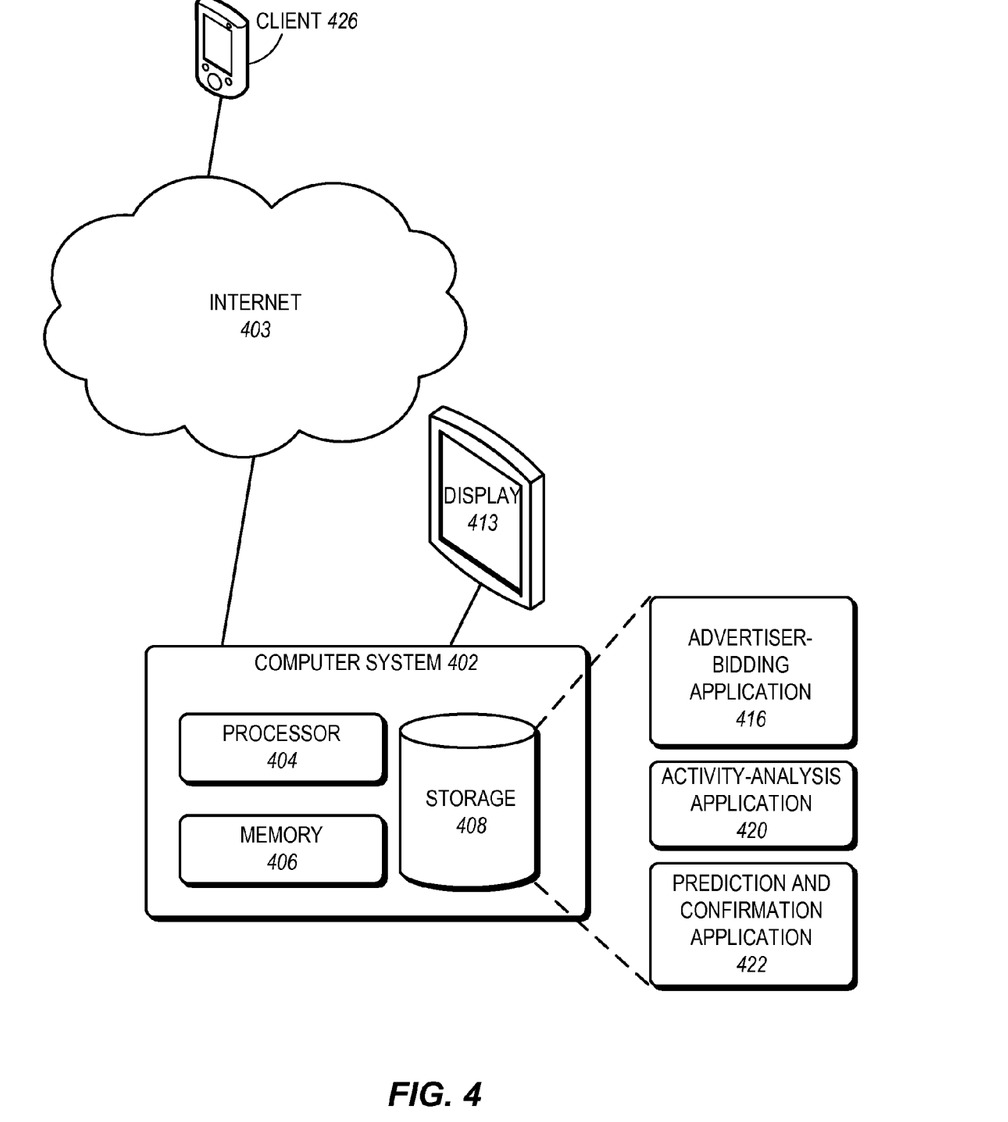
FIG. 4 illustrates an exemplary computer system that facilitates an advertising system that facilitates confirmed-prediction-based payments, in accordance with an embodiment of the present invention.

FIG. 4 illustrates an exemplary computer system that facilitates an advertising system that facilitates confirmed-prediction-based payments, in accordance with an embodiment of the present invention. In this example, computer system 402 performs the functions for a provider. Via Internet 403, computer system 402 is in communication with a client 426, which in one embodiment can be a PDA or cell phone.

Computer system 402 can include a processor 404, a memory 406, and storage device 408. In one embodiment, computer system 402 is coupled to a display 413. Storage device 408 stores an advertiser-bidding application 416, an activity-analysis application 420, and a prediction and confirmation application 422. During operation, advertiser-bidding application 416, activity-analysis application 420, and prediction and confirmation application 422 are loaded from storage device 408 into memory 406, and executed by processor 404. Accordingly, processor 404 performs the aforementioned functions to facilitate a payment mechanism based on confirmed activity predictions.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments described herein have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
obtaining, by a computer, contextual data associated with a behavior of a user, wherein the contextual data includes traces of a location of the user at a plurality of times, wherein the traces are collected based on a GPS equipped on a mobile device of the user;

generating, by the computer, a prediction predicting a first location that the user will visit during a future target time window based on the GPS-collected traces of the location of the user at the plurality of times;

providing, to one or more advertisers, the prediction to receive one or more advertising bids;

sending, by the computer over a computer network to the mobile device associated with the user, an advertisement corresponding to a winning advertising bid and a display instruction for the advertisement;

presenting, by the mobile device on a display of the mobile device, the advertisement based on the display instruction;

determining, by the computer based on data received by the GPS equipped on the mobile device, whether the user visits the predicted first location within the future target time window;

in response to the computer determining that the user visits the predicted first location within the future target time window, receiving a first payment for presenting the advertisement; and in response to the computer determining that the user visits a second location associated with the advertisement within the future target time window, wherein the second location is different from the predicted first location, receiving a second payment for presenting the advertisement.

2. The method of claim 1, further comprising computing an estimated accuracy of the prediction that the user visits the first location within the future target time window.

3. The method of claim 2, further comprising determining the winning advertising bid based on the estimated accuracy.

4. The method of claim 2, further comprising communicating the estimated accuracy of the prediction to the one or more advertisers, thereby allowing the one or more advertisers to set their bids accordingly.

5. The method of claim 1, further comprising receiving, from an advertiser, a purchase for an insurance to receive a refund when the user fails to visit the predicted first location within the future target time window.

6. The method of claim 1, further comprising:
determining whether the user is influenced by the presented advertisement based on an action performed by the user subsequent to the presentation of the advertisement; and
receiving an additional payment in response to determining that the user is influenced by the presented advertisement.

7. A non-transitory computer-readable medium storing instructions which when executed by a computer cause the computer to perform a method, the method comprising:
obtaining, by the computer, contextual data associated with a behavior of a user, wherein the contextual data includes traces of a location of the user at a plurality of times, wherein the traces are collected based on a GPS equipped on a mobile device of the user;
generating, by the computer, a prediction predicting a first location that the user will visit during a future target time window based on the GPS-collected traces of the location of the user at the plurality of times;
providing, to one or more advertisers, the prediction to receive one or more advertising bids;
sending, by the computer over a computer network to the mobile device associated with the user, an advertisement corresponding to a winning advertising bid and a display instruction for the advertisement;
presenting, by the mobile device on a display of the mobile device, the advertisement based on the display instruction;
determining, by the computer based on data received by the GPS equipped on the mobile device, whether the user visits the predicted first location within the future target time window;
in response to the computer determining that the user visits the predicted first location within the future target time window, receiving a first payment for presenting the advertisement; and
in response to the computer determining that the user visits a second location associated with the advertisement within the future target time window, wherein the second location is different from the predicted first location, receiving a second payment for presenting the advertisement.

8. The computer-readable medium of claim 7, wherein the method further comprises computing an estimated accuracy of the prediction that the user visits the first location within the future target time window.

9. The computer-readable medium of claim 8, wherein the method further comprises determining the winning advertising bid based on the estimated accuracy.

10. The computer-readable medium of claim 8, wherein the method further comprises communicating the estimated accuracy of the prediction to the one or more advertisers, thereby allowing the one or more advertisers to set their bids accordingly.

11. The computer-readable medium of claim 7, wherein the method further comprises receiving, from an advertiser, a purchase of an insurance to receive a refund when the user fails to visit the predicted first location within the future target time window.

12. The computer-readable medium of claim 7, wherein the method further comprises:
determining whether the user is influenced by the presented advertisement based on an action performed by the user subsequent to the presentation of the advertisement; and
receiving an additional payment in response to determining that the user is influenced by the presented advertisement.

13. A computer system, the system comprising:
a processor; and
a memory coupled to the processor and storing instructions, which when executed by the processor cause the processor to perform a method, the method comprising:
obtaining, by the computer system, contextual data associated with a behavior of a user, wherein the contextual data includes traces of a location of the user at a plurality of times, wherein the traces are collected based on a GPS equipped on a mobile device of the user;
generating, by the computer system, a prediction predicting a first location that the user will visit during a future target time window based on the GPS-collected traces of the location of the user at the plurality of times;
providing, to one or more advertisers, the prediction to receive one or more advertising bids;
sending, by the computer system over a computer network to the mobile device associated with the user, an advertisement corresponding to a winning advertising bid and a display instruction for the advertisement;

presenting, by the mobile device on a display of the mobile device, the advertisement based on the display instruction;

determining, by the computer system based on data received by the GPS equipped on the mobile device, whether the user visits the predicted first location within the future target time window;

in response to the computer system determining that the user visits the predicted first location within the future target time window, receiving a first payment for presenting the advertisement; and in response to the computer system determining that the user visits a second location associated with the advertisement within the future target time window, wherein the second location is different from the predicted first location, receiving a second payment for presenting the advertisement.

14. The computer system of claim 13, wherein the method further comprises computing an estimated accuracy of the prediction that the user visits the first location within the future target time window.

15. The computer system of claim 14, wherein the method further comprises determining the winning advertising bid based on the estimated accuracy.

16. The computer system of claim 14, wherein the method further comprises communicating the estimated accuracy of the prediction to the one or more advertisers, thereby allowing the one or more advertisers to set their bids accordingly.

17. The computer system of claim 13, wherein the method further comprises:
   determining whether the user is influenced by the presented advertisement based on an action performed by the user subsequent to the presentation of the advertisement; and
   receiving an additional payment in response to determining that the user is influenced by the presented advertisement.

* * * * *